(12) United States Patent
Ortiz-Julien

(10) Patent No.: US 8,268,372 B2
(45) Date of Patent: Sep. 18, 2012

(54) METHOD FOR PREVENTING DEFECTIVE AGEING OF WHITE WINES

(75) Inventor: Anne Ortiz-Julien, Gagnac-sur-Garonne (FR)

(73) Assignee: Danstar Ferment AG, Zug (CH)

(*) Notice: Subject to any disclaimer, the term of this patent is extended or adjusted under 35 U.S.C. 154(b) by 815 days.

(21) Appl. No.: 10/586,667

(22) PCT Filed: Jan. 19, 2005

(86) PCT No.: PCT/FR2005/000115
§ 371 (c)(1),
(2), (4) Date: Jul. 20, 2006

(87) PCT Pub. No.: WO2005/080543
PCT Pub. Date: Sep. 1, 2005

(65) Prior Publication Data
US 2008/0254163 A1    Oct. 16, 2008

(30) Foreign Application Priority Data
Jan. 20, 2004    (FR) ...................................... 04 00464

(51) Int. Cl.
*C12G 1/022*    (2006.01)
(52) U.S. Cl. ............................................. 426/15; 426/62
(58) Field of Classification Search .................... 426/15, 426/62
See application file for complete search history.

(56) References Cited

FOREIGN PATENT DOCUMENTS

| | | | |
|---|---|---|---|
| IT | EP 1236795 | * | 9/2002 |
| JP | 6-75500 | | 9/1994 |
| WO | 91/05846 | | 5/1991 |

OTHER PUBLICATIONS

Salgues, M. et al. 1986. Oxidation of grape juice 2-S-glutathionyl caffeoyl tartaric acid by Botrytis cinerea laccase and characterization of a new substance 2,5-di-S-glutathionyl caffeoyl tartaric acid. J. Food. Sci. 51(5): 1191-1194.*
JP-3-262473—1991—English Abstract—pp. 10-11.*
International Search Report of PCT/FR2005/000115, mailed May 19, 2005.
Database WPI, Section Ch, Week 199437, Derwent Publications Ltd., AN 1992-012691, XP002284003.
Park et al; "Isolation and identification of the high-glutathione producing *Saccharomyces cerevisiae* FF-8 from Korean traditional Rice Wine and optimal producing conditions", Journal of the Korean Society of Agricultural Chemistry and Iotechnology, vol. 46, No. 4, 2003, pp. 348-352, XP008031614.
Roussis et al; "Inhibition of oxidative browning in white wines by hohocysteine", Wein-Wissenschaft, vol. 55, No. 1, 2000, pp. 29-32, XP002284748.

* cited by examiner

Primary Examiner — D. Lawrence Tarazano
Assistant Examiner — Hamid R Badr
(74) Attorney, Agent, or Firm — Nixon & Vanderhye P.C.

(57) ABSTRACT

The invention relates to a method for preparing a wine in such a way as to prevent the problems of defective ageing, according to which yeast which has been previously enriched in glutathione is introduced into the must at the beginning, during or following the alcoholic fermentation. Said enriched yeast contains more than 0.5% of glutathione, especially at least 1% of glutathione, and preferably at least 1.5% of glutathione, expressed in weight added to the weight of the dry substance of the yeast. The inventive method enables fresh white wines to be produced, which are more fruity with a more complex range of aromas. During the ageing of said wines, the freshness of the aromas is preserved and browning prevented. The invention also relates to a must which is enriched in glutathione by the introduction of enriched yeast, and to the wine produced in this way.

14 Claims, 3 Drawing Sheets

METHOD FOR PREVENTING DEFECTIVE AGEING OF WHITE WINES

This application is the US national phase of international application PCT/FR2005/000115, filed 19 Jan. 2005, which designated the U.S. and claims priority of FR 0400464, filed 20 Jan. 2004, the entire contents of each of which are hereby incorporated by reference.

The present invention relates to the field of the production and preservation of wines, in particular that of white wines.

It relates to a method for preparing a wine that makes it possible to prevent the problems of defective ageing due to the introduction of glutathione-enriched yeast into the must before bottling. The present invention also relates to a must enriched in glutathione by the introduction of enriched yeast, and also to the wine thus obtained.

The problems associated with the ageing of white wines are well known to wine growers. They manifest themselves through a loss of varietal aromas, a modified organoleptic profile and a brown coloration of the wines. Oxidation phenomena are to be related to these aromatic and chromatic changes.

In particular, the browning of white wines is attributed to oxidative polymerizations of certain polyphenols. The latter, by reacting with oxygen, produce quinones and semiquinones. These compounds complex with volatile thiols to form brown pigments. The aromatic properties of the volatile thiols, once the latter have become complexed, can no longer be expressed.

Now, white wines are developed with the objective of obtaining fresh, fruity wines to be consumed quite rapidly, or else wines referred to as "premium" which are aged for several years. In both cases, it is essential to protect the wines against oxidation and browning which can cause the organoleptic profile of these white wines to deteriorate. Specifically, deterioration of aromas and browning represent a loss of profits which is considerable in economic terms.

Several solutions have been envisioned for preventing this browning and the organoleptic deviations which are associated therewith:
1. limiting exposure to oxygen,
2. using chemical antioxidants such as $SO_2$,
3. eliminating the polyphenols responsible for the browning.

Given the fact that any contact of the product with oxygen during the development thereof must be avoided, exposure to oxygen is already extremely reduced. An even stricter limitation would require considerable efforts difficult to realize in practice and disproportionate to the possible gain.

The second solution is based on the use of $SO_2$ as an antioxidant. The addition of $SO_2$ to the musts during alcoholic fermentation has been widely carried out, but is today increasingly limited since wine growers avoid resorting thereto for reasons related to product quality, but also because of interferences with malolactic fermentation.

In order to eliminate the polyphenols in order to correct the browning of white wines, bonding agents are commonly used, such as activated charcoal or PVPP (Fialdes, E., Rev. des Oenologues [Enologist Review], 1989, 54, 19-22; Baron, R. et al., Z. Lebensm. Unters Forsch, 1997, 205, 474-78). However, these substances have the drawback of impairing the flavors and aromas of wines (Sims, C. A., et al., Am. J. Enol. Vitic; 1995, 46(2), 155-158). In addition, certain polyphenols such as resveratrol, since they have very advantageous properties from a dietary point of view and on health, do not justify being eliminated.

Thus, none of the current practices make it possible to satisfactorily be free of the problem of aroma deterioration and browning of white wines during ageing.

To remedy the drawbacks disclosed, it has been suggested to treat wine with bakers' yeast (Bonilla et al., J. Agric. Food Chem., 2001, 49, 1928-1933). Specifically, yeast membranes have the property of retaining certain compounds, and in particular coloring substances such as anthocyanins. The wines were treated with doses of yeast ranging from 0.5 g/l to 5 g/l for 24 hours, and were then filtered. An effect on the coloration was observed, while the gustative properties were preserved. This technique, which belongs to the "green technologies", has however the drawback of requiring microbiological sterilization in order to guarantee that all the yeast cells are extracted before they can multiply and impair the transparency and the organoleptic properties of the wine.

Another study was based on the observation that the impairment of the aroma and of the color of fruit juices could be corrected by the addition of sulfur-containing peptides or amino acids (Molnar-Perl et al., 1990). By analogy, it has been suggested that the browning and the deterioration of the aromas of white wines may be related to the presence, to a greater or lesser extent, of sulfur-containing compounds, such as glutathione (Dubourdieu et al., 2003, 7éme Symposium International d'Oenologie, [7th International Symposium on Enology] Bordeaux, http//vinideanet.com). Firstly, the presence, in musts, of glutathione in its reduced form was demonstrated. Its concentration depends on the nitrogen content, and varies, according to the progression of the fermentation, between a few milligrams and about 20 milligrams per liter. It has also been shown that the addition, at bottling, of 10 mg/l of glutathione to a white wine limits the yellowing of its color, the erosion of its aroma and its tendency to defective ageing. These results cannot, however, be transposed to the practice of wine growers, because the addition of glutathione to a finished wine is not permitted in enological practices. Moreover, the introduction of glutathione to the must cannot be envisioned because it is known that glutathione, since it constitutes a nitrogen source, can be consumed during the alcoholic fermentation by the inoculated active yeasts.

Thus, while these studies provide an interest for understanding the phenomena involved in the deterioration of aromas and the browning of white wines, no technical solution is proposed for overcoming these problems in practice.

Surprisingly and unexpectedly, it has been found that an introduction of glutathione-enriched yeast into the must makes it possible to obtain fresh, fruitier white wines, with complex aromas, and that, during the ageing of these wines, the freshness of these aromas is preserved and browning is avoided. This yeast can be introduced at any time, from the beginning of alcoholic fermentation until bottling, with the same beneficial effect.

Figure 1:
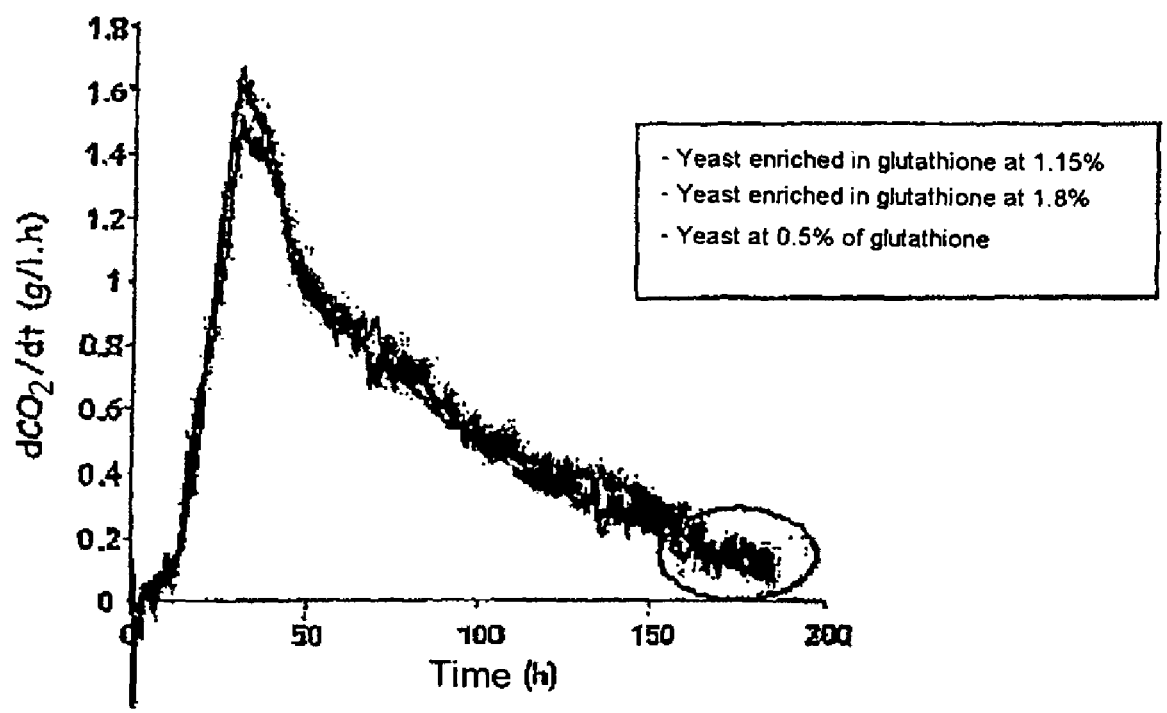
FIG. 1 shows that addition of glutathione-enriched yeast at the beginning of alcoholic fermentation has no negative effect on the fermentative kinetics, whatever the glutathione content added.

As regards the mechanisms of action, the hypothesis can be put forward that the yeast cells play a role protecting the glutathione during alcoholic fermentation and then release it during the post-fermentary phases. The glutathione might react, during maturing or after bottling, with the quinones so as to form a colorless complex, then preventing these same quinones from reacting with the volatile thiols (aromatic molecules), which usually causes a brown complex, and which prevents aromatic expression.

However, this result is particularly surprising since yeasts naturally contain a certain amount of glutathione, ranging from 0.2% to 0.5%, i.e. 0.2 g to 0.5 g of glutathione per 100 g of yeast solids. Now, it has never been reported that the inoculation of yeasts intended to initiate alcoholic fermentation produces any effect whatsoever on the defective ageing of white wines.

The present invention provides numerous advantages for professionals. By virtue of the method claimed, it is in fact possible to obtain, using only natural ingredients, white wines of quality corresponding to the following criteria:
roundness of the wine,
freshness and fruitiness,
stability of aromas over time,
stability of color over time.

No addition of foreign substances such as chemical antioxidants is required, no complex handling is necessary.

The method according to the invention also has advantages for consumers. Specifically, glutathione, a tripeptide composed of glutamate-cysteine-glycine, is increasingly studied in the field of medicine, where it is described as the "master antioxidant". Glutathione, by virtue of its sulfur-containing amino acid (cysteine), is considered to play an important role in detoxifying cells and strengthening the immune system. Now, since cysteine is rare in the human diet, glutathione is synthesized only in small amounts. A direct intake of glutathione through the diet could thus have a beneficial effect on the health.

More specifically, a subject of the present invention is a method for preparing a wine according to the methods commonly used by professionals, in which yeast previously enriched in glutathione is introduced into the must at the beginning of, during or after the alcoholic fermentation step. In the present application, the expression "enriched yeast" expressly denotes a glutathione-enriched yeast. The term "glutathione" is intended to mean the molecule composed of the three amino acids glutamate-cysteine-glycine, in its oxidized or reduced form.

The production of glutathione-enriched yeast is well known to those skilled in the art who know how to prepare it by means of one of the techniques at their disposal; see, for example, Catalino et al., 1992, Applied Microbiology and Biotechnology, Ed Springer-Verlag, pp. 141-146. Up until now, glutathione-enriched yeasts were used in baking for reinforcing gluten in doughs and improving the elasticity of the dough.

The enriched yeast can be introduced into the must at any moment before the bottling of the wine, at the beginning of the alcoholic fermentation, during the process of the latter, or even when the latter is complete, for example during maturing in casks, where appropriate. For reasons of simple convenience, it is recommended to introduce it at the beginning of fermentation.

The term "must" is intended to mean a fruit juice, a fruit juice during fermentation or a fruit juice in which alcoholic fermentation is complete, up until a finished wine is obtained, optionally after maturing in casks. When the wine is finished, it is filtered for bottling. At this stage, for obvious practical reasons, it becomes difficult to envision introducing enriched yeasts.

The yeast is preferably chosen from the yeasts normally used in enology, for example *Saccharomyces cerevisiae* and non-Saccharomyces having an enological advantage. Advantageously, it is possible to use, as glutathione-enriched yeast, the same species, or even the same strain, as that used to carry out the alcoholic fermentation.

In the method according to the invention, said glutathione-enriched yeast contains more than 0.5% of glutathione by weight relative to the weight of solids of the yeast. Advantageously, said glutathione-enriched yeast contains at least 1% of glutathione, and preferably at least 1.5% of glutathione, by weight relative to the weight of solids of the yeast. For example, for optimum effectiveness, an enriched yeast containing 1.8% of glutathione is used.

According to an advantageous embodiment of the method according to the invention, said glutathione-enriched yeast is added to the must in a proportion of 0.1 g to 1 g of solids per liter of must, preferably 0.3 g/l to 0.7 g/l, and more preferably in a proportion of 0.5 g/l.

The dosage of the amount of enriched yeast introduced into the must can be modulated according to various parameters, such as the degree of glutathione enrichment of the yeasts or the size of the desired effect. Finally, those skilled in the art may determine the dose of yeast to be introduced according to the amount of glutathione that they wish to provide. Thus, according to an advantageous characteristic of the method according to the invention, the introduction of the glutathione-enriched yeast into the must produces a provision of at least 3 mg of glutathione per liter of must, preferably at least 5 mg, it being possible for the upper limit to reach 100 mg/l although the provision of the corresponding amounts of yeast is economically unacceptable. According to a particularly preferred embodiment, the glutathione-enriched yeast produces a provision of approximately 9 mg of glutathione per liter of must, these amounts being understood to be in addition to the amounts usually provided by fermentative yeasts.

As indicated above, the enriched yeast can be introduced into the must at any moment before the bottling of the wine, at the beginning of alcoholic fermentation, during the process of the latter or even when the latter is complete. In certain cases, it is nevertheless recommended to wait a few hours after the inoculation of the fermentative yeasts so as not to impair the initiation of alcoholic fermentation by interfering with the multiplication and the implantation of the selected strain.

Moreover, the enriched yeast can be introduced into the must in the form of inactive dry yeast, but also in the form of active dry yeast. There is in fact nothing to stop the wine producer carrying out several introductions of enriched yeast, taken in different forms. The wine producer can, for example, introduce an enriched active yeast at the same time as he inoculates the must with the fermentative yeasts, and can then add a second amount of enriched yeast during the fermentation, for example in inactive form.

Finally, according to the method claimed, the glutathione-enriched yeast can be introduced into the must in one or more of the following forms: active yeast, inactive yeast, dry or liquid.

In general, the enriched yeast is introduced as a supplement to the yeast inoculated in order to initiate alcoholic fermentation. However, it is entirely possible, and even advantageous, for the fermentative yeast to itself be enriched in glutathione. A single yeast inoculation is then carried out before the alcoholic fermentation. If necessary, an additional introduction of enriched yeast can be carried out, immediately or subsequently, during the fermentation or the maturing.

For example, to initiate the fermentation, the must is inoculated with 0.25 g/l of fermentative yeast enriched at 1.8%, and then, when the phase consisting of multiplication of the active yeasts is complete and the fermentation begins, 0.25 g/l of inactive dry yeast enriched at 1.8% is provided. In this case, the total provision of enriched yeasts is 0.5 g/l of must. The total provision of glutathione is 9 mg/l, i.e. 1.25 mg/l usually provided by the active yeast, to which are added 7.75 mg/l provided as a supplement.

Thus, according to a specific embodiment of the method according to the invention, the glutathione-enriched yeast consists at least in part of the yeast inoculated into the must in order to carry out the alcoholic fermentation.

In accordance with the method for preparing a wine according to the invention, the must has specific characteristics which confer on the wine finally obtained the good preservation properties described above, attributable to the presence of glutathione-enriched yeast. Another subject of the present invention is thus a must, such as a grape must, in which an alcoholic fermentation occurs (or has occurred), comprising glutathione-enriched yeasts. These yeasts are, for example, *Saccharomyces cerevisiae* and non-*Saccharomyces* having an enological advantage.

In particular, the must according to the invention comprises yeasts enriched at more than 0.5% in glutathione. Preferably, said yeasts contain at least 1%, and preferably at least 1.5% of glutathione, by weight relative to the weight of solids of the yeast. There is no disadvantage in introducing into the must yeasts even more enriched in glutathione, since the determining parameter appears to be the amount of glutathione provided. The amount of yeast introduced may thus be modulated according to the degree of glutathione enrichment and the total provision of glutathione desired.

According to an advantageous characteristic, the must according to the invention comprises an amount of glutathione-enriched yeasts corresponding to a content of at least 3 mg of glutathione per liter of must, preferably at least 5 mg. Optimally, the must comprises approximately 9 mg of glutathione per liter of must. Larger amounts can also be used without any specific drawback, other than the fact that the results obtained with respect to ageing will not be notably improved, and the costs will be increased.

It will have been understood that the method described above is essentially intended for the preparation of white wines, the latter being particularly affected by the problems of defective ageing. It will most particularly be applied to the prevention of the browning of white wines after bottling.

The wines prepared by means of a method according to the invention or the wines produced from a must as claimed are also subjects of the present invention.

The following examples describe in detail various aspects of the present invention and illustrate the advantages of the method for preparing a wine for the prevention of defective ageing.

EXAMPLE 1

Method of Assaying Glutathione in Yeast

The enriched yeast is characterized by assaying its glutathione content according to the method below.
1. Principle
   5,5'-Dithiobis-2-nitrobenzoic acid (DTNB) reacts at pH 8 with the SH groups, so as to give one mole of yellow-colored anion from one mole of compound comprising an SH group. The concentration can be determined by measuring the yellow color using a spectrophotometer at 412 nm.
2. Equipment
   Spectrophotometer
   Stirrer-mixer
   Centrifuge (10 000 G)
   Pipettes P100, P1000, P5000
3. Reagents
   0.1N NaOH: 0.4 g of NaOH diluted in 100 ml of distilled water
   0.1N HCl
   TE8 buffer (50 mM of tris, 3 mM of EDTA, approximately 38 mM HCl, pH 8.0).
      Dissolve 6.05 g of Tris+1.1167 g of EDTA in the form of disodium dihydrate salt ($C_{10}H_{14}N_2Na_2.O_8.2H_2O$) in 900 ml of distilled water.
      After dissolution, bring the pH to 8.0 with approximately 38 ml of 1N HCl.
      Make the volume up to 1000 ml with distilled water. Store at 4° C.
   DTNB reagent (5,5'-dithiobis-2-nitrobenzoic acid)
      Prepare a stock solution of DTNB, which may be stored for at least one month at 4° C. in the dark. Dissolve 39.6 mg of DTNB+8 ml of TE8+2 ml of 0.1N NaOH (up to pH 8.0), in a test tube. Add NaOH last.
      Prepare the reagent on the day of the assay: dilute 0.8 ml of stock solution of DTNB with TE8 until 100 ml are obtained.
4. Standard Curve for Assaying Glutathione (GSH)
   Prepare fresh solutions as follows

| S1: | 30.7 mg GSH + 10 ml | 0.1N HCl | (10 mM) |
|---|---|---|---|
| S2: | 1.0 ml of S1 + 4 ml | 0.1N HCl | (2 mM) |
| S3: | 0.5 ml of S1 + 4.5 ml | 0.1N HCl | (1 mM) |
| S4: | 0.3 ml of S1 + 4.7 ml | 0.1N HCl | (0.6 mM) |
| S5: | 0.2 ml of S1 + 4.8 ml | 0.1N HCl | (0.4 mM) |
| S6: | 0.1 ml of S1 + 4.9 ml | 0.1N HCl | (0.2 mM) |

Measure the absorbance
      Zero: 0.1 ml HCl+4.9 ml of DTNB reagent.
      For each of the solutions S2 to S6, introduce 0.1 ml of GSH solution into 4.9 ml of DTNB reagent. Stir and measure at 412 nm after leaving to stand at ambient temperature for 10 minutes. All the measurements must be carried out in less than one hour.
      Plot the curve of absorbance as a function of GSH concentration in mM. A linear regression curve is obtained.
5. Measurement of GSH in the Samples
   Extraction of GSH from dry yeast products
      Add 0.4 g of sample to 10.0 ml of 0.1N HCl in a centrifuge tube and agitate so as to obtain a suspension (if the water content is clearly greater than 4%, adjust the amount of sample).
      Mix regularly during the digestion period (30 to 60 minutes).

Centrifuge at 8000 rpm for approximately 5 minutes (or longer if the rotation speed is less). The supernatant must be transparent to the naked eye.

Assaying GSH

Introduce 0.1 ml of supernatant into 4.9 ml of DTNB reagent.

Agitate and measure at 412 nm after leaving to stand at ambient temperature for 10 minutes. All the measurements must be carried out in less than one hour.

Using the measured absorbance value, read, on the standard curve, the corresponding concentration of GSH present in the solution analyzed.

Calculation of the glutathione content in the yeast:

For a product having a water content of less than 4%, the calculation is as follows:

mg GSH/g sample=

$$\text{mM } GSH \text{ (read on curve)} \times \frac{307.32 \text{ mg } GSH}{\text{liter solution}} \times \frac{10 \text{ ml solution}}{0.4 \text{ g sample}} \times \frac{1 \text{ liter}}{1000 \text{ ml}}$$

or more simply, mg GSH/g sample=mM GSH (read)×7.683.

For a product having a water content of more than 4% and a solids content (% SC), the calculation is as follows:

mg GSH/g sample=

$$\text{mM } GSH \text{ (read on curve)} \times \frac{307.32 \text{ mg } GSH}{\text{liter solution}} \times \frac{10 \text{ ml solution}}{0.4 \text{ g sample}} \times \frac{1 \text{ liter}}{1000 \text{ ml}} \times \frac{100\%}{\% \text{ SC sample}}$$

NB. The DTNB reagent is not specific for GSH, but reacts with all free SH groups.

EXAMPLE 2

Addition of Glutathione-Enriched Yeast at the Beginning of Fermentation

1)—Preparation of Glutathione-Enriched Yeasts

A yeast belonging to the species *Saccharomyces cerevisiae* (bakers' yeast 2133®, Lallemand, Canada) is enriched in various glutathione contents by the method described by C. Alfafara (Alfafara C. et al, Appl. Microbiol. Biotechnol. Ed. Springer-Verlag 1992, pp. 141-146). After treatment, the glutathione content is verified according to the protocol described in example 1.

The two enriched yeasts, denoted SC1 and SC2, contain respectively 1.15% and 1.8% of glutathione, expressed by weight relative to the weight of dry yeast. The yeasts are dried and inactivated according to the usual known methods, and placed in a hermetic container.

2)—Implementation

Three alcoholic fermentations are carried out in parallel on a Chardonnay must in 1.1-liter fermenters. Each fermenter is inoculated with 0.25 g/l of active dry yeast (EC1118®, Lallemand, Canada), rehydrated according to the standard method (30 minutes in water at 37° C.). This yeast, here denoted SCo, naturally contains 0.5% of glutathione.

After having controlled the initiation of fermentation by means of a technique at the disposal of those skilled in the art (measurement of $CO_2$ given off or measurement of sugar consumption), 0.3 g/l of SC1 and SC2 yeast is introduced into the fermenters F1 and F2, respectively. The amounts of glutathione provided are thus as follows:

in the three fermenters: provision of 1.25 mg/l by means of the fermentative yeast;

in F1: provision of a further 3.45 mg/l;

in F2: provision of a further 5.40 mg/l.

3)—Effect on the Fermentative Kinetics

The fermentative kinetics are followed in each fermenter by measuring the $CO_2$ given off.

The results are given in FIG. 1. They show that addition of glutathione-enriched yeast at the beginning of alcoholic fermentation has no negative effect on the fermentative kinetics, whatever the glutathione content added.

When the alcoholic fermentation is complete, the wines Vo, V1 and V2 of each fermenter are decanted, filtered and conserved at 14° C. in bottles laid down in a thermostatted premises. After one month, organoleptic tests and sensory analyses are carried out on samples of Vo, V1 and V2.

4)—Effect on the Gustative Qualities of the Wine

A jury of experts made up of 15 individuals carried out a blind tasting. Table 1 below expresses the results of the tasting on the wines with addition at the beginning of alcoholic fermentation, carried out by an expert jury.

TABLE 1

| Sample | Vo | V1 | V2 |
|---|---|---|---|
| Content | 0.5% glutathione | 1.15% glutathione | 1.8% glutathione |
| Sum of rankings | 17 | 15 | 10 |
| 1/sum of rankings | 0.059 | 0.065 | 0.100 |

EXAMPLE 3

Addition of Glutathione-Enriched Yeast During Fermentation

1)—Implementation

Three fermentations are carried out according to the protocol described in example 1, with the difference that the SC1 and SC2 yeasts are introduced into the fermenters F1 and F2 in the middle of alcoholic fermentation medium. Half the fermentation is carried out when half the sugar initially present in the fruit juice has been consumed.

2)—Effect on the Fermentative Kinetics

The fermentative kinetics are followed in each fermenter by measuring the $CO_2$ given off.

Figure 2:
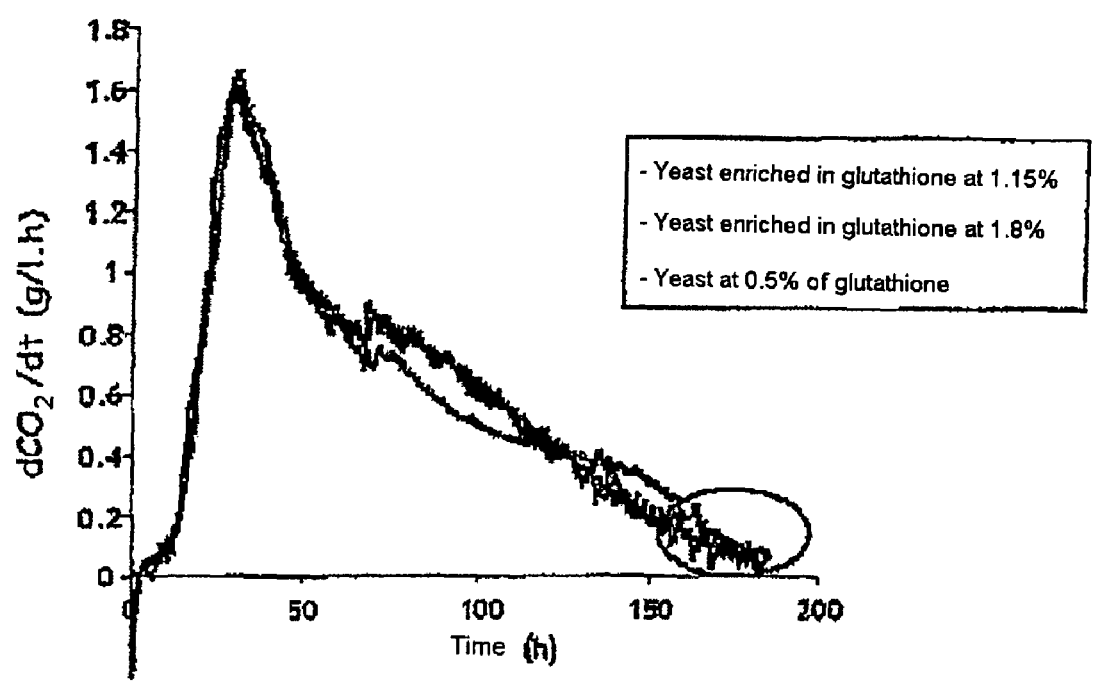
FIG. 2 shows that addition of glutathione-enriched yeast in the middle of alcoholic fermentation does not significantly influence the fermentative performance levels of the active yeast inoculated.

The results are given in FIG. 2. They show that addition of glutathione-enriched yeast in the middle of alcoholic fermentation does not significantly influence the fermentative performance levels of the active yeast inoculated.

EXAMPLE 4

Modification of the Organoleptic Profile after Treatment with a Glutathione-Enriched Yeast at the Beginning of Fermentation 1)—Fermentations Two fermentations are carried out on a "Chardonnay de Champagne" must, the initial characteristics of which are as follows:

| | |
|---|---|
| pH | 3.07 |
| Total $SO_2$ | 84 mg/l |
| Free $SO_2$ | 22 mg/l |
| Malic acid | >3.4 g/l |
| Total acidity | 7.45 g/l $H_2SO_4$ |
| Sugar | 137 g/l |
| Density | 1062 |
| Volatile acidity | 0.02 g/l $H_2SO_4$ |
| Turbidity | 14.44 |
| Assimilatable N | 224.5 mg/l |

After chaptalization of the must at 12%, the final density is 1087.5 and the sugar concentration reaches 202 g/l.

The trials are carried out on 1-liter fermenters, the yeast inoculated is the Vitilevure C® (Martin Vialatte, France), at the dose of 0.20 g/l. When the fermentation is initiated, the glutathione-enriched yeast SC2 is added to one of the fermenters at 0.30 g/l (i.e. 5.4 mg/l of glutathione added).

2)—Fermentative Kinetics

Figure 3:
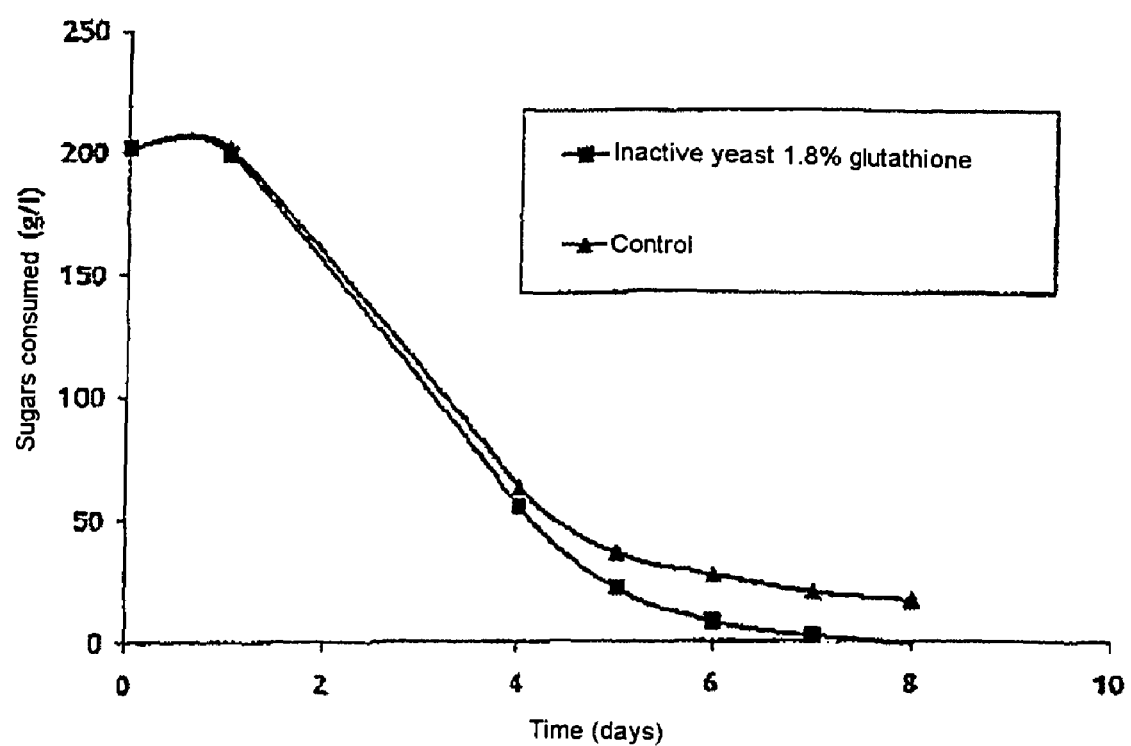
FIG. 3 shows that there is no harmful effect on the kinetic performance levels, and that, conversely, a small positive effect is observed, since the must containing the enriched yeast completes the fermentation more rapidly.

The fermentative kinetics are followed in order to verify the correct progression of the fermentation. The results obtained (see FIG. 3) show that there is no harmful effect on the kinetic performance levels, and that, conversely, a small positive effect is observed, since the must containing the enriched yeast completes the fermentation more rapidly.

3)—Organoleptic Tests

The two wines obtained are tested in tasting by a panel of 15 individuals. The organoleptic results obtained are shown in table 2. They show that the wine treated with the glutathione-rich inactive yeasts was preferred, with an increase in volume in the mouth and very marked fruity aromas compared with the control wine.

TABLE 2

| | Control | With the addition of 0.30 g/l SC2 |
|---|---|---|
| Sum of rankings | 27 | 11 |
| 1/sum of rankings | 0.037 | 0.091 |

EXAMPLE 5

Effect of the Provision of Glutathione-Enriched Yeast on the Coloration of the Wine Two alcoholic fermentations are carried out in parallel, in 1.1-liter fermenters Fo and F1, on the Chardonnay must for which the characteristics are given in example 4. The fermenters Fo and F1 are inoculated with 0.25 g/l of active dry yeast (EC1118®, Lallemand, Canada), rehydrated according to the standard method (30 minutes in water at 37° C.). This yeast naturally contains 0.5% of glutathione.

In the fermenter F1, 0.3 g/l of SC2 yeast enriched in glutathione at 1.8% (i.e. 5.4 mg/l of glutathione added), prepared as described in example 2, is added at the beginning of fermentation. When the fermentation is complete, the control wine Vo and the treated wine V1 are filtered, bottled, and stored at 14° C., laid down. Absorbance measurements at 420 nm are carried out after various periods of elapsed time. The results obtained after two months are given in table 3.

TABLE 3

| Duration of storage | 2 months | 4 months |
|---|---|---|
| Control Vo | 0.247 | 0.256 |
| Treated wine V1 | 0.215 | 0.190 |

It is observed that, in the control wine, the coloration accentuates slightly, whereas the wine treated with the enriched yeast exhibits a clear improvement of its tint. The treatment according to the invention is thus effective from the first weeks of storage.

The invention claimed is:

1. A method for the prevention of defective ageing of white wines, wherein, during the preparation of said wine, yeast previously enriched in glutathione is introduced into the must in the form of a inactive dry yeast, at the beginning of, during or after the alcoholic fermentation step.

2. The method as claimed in claim 1, wherein said glutathione-enriched yeast contains more than 0.5% of glutathione by weight relative to the weight of solids of the yeast.

3. The method as claimed in claim 1, wherein said glutathione-enriched yeast contains at least 1% of glutathione by weight relative to the weight of solids of the yeast.

4. The method of claim 3 wherein the yeast contains at least 1.5% of glutathione by weight relative to the weight of solids of the yeast.

5. The method as claimed in claim 1, wherein said glutathione-enriched yeast is introduced into the must in a proportion of 0.1 g to 1 g of solids per liter of must.

6. The method of claim 5 wherein the glutathione-enriched yeast is introduced into the must in a proportion of 0.3 g/l to 0.7 g/l of must.

7. The method of claim 5 wherein the glutathione-enriched yeast is introduced into the must in a proportion of 0.5 g/l of must.

8. The method as claimed in claim 1, wherein the introduction of said glutathione-enriched yeast into the must provides at least 3 mg of glutathione per liter of must.

9. The method of claim 8 wherein the introduction of said glutathione-enriched yeast into the must provides at least 5 mg of glutathione per liter of must.

10. The method of claim 8 wherein the introduction of said glutathione-enriched yeast into the must provides approximately 9 mg of glutathione per liter of must.

11. The method as claimed in claim 1, wherein said glutathione-enriched yeast consists at least in part of the yeast inoculated into the must in order to carry out the alcoholic fermentation.

12. A method for the prevention of defective ageing of white wines, wherein, during the preparation of said wine, yeast previously enriched in glutathione is introduced into the must in a single yeast inoculation before alcoholic fermentation.

13. The method according to claim 12, wherein said glutathione-enriched yeast contains more than 0.5% of glutathione by weight relative to the weight of solids of the yeast.

14. The method according to claim 12, wherein said glutathione-enriched yeast contains at least 1% of glutathione by weight relative to the weight of solids of the yeast.

* * * * *